United States Patent Office 3,536,301
Patented Oct. 27, 1970

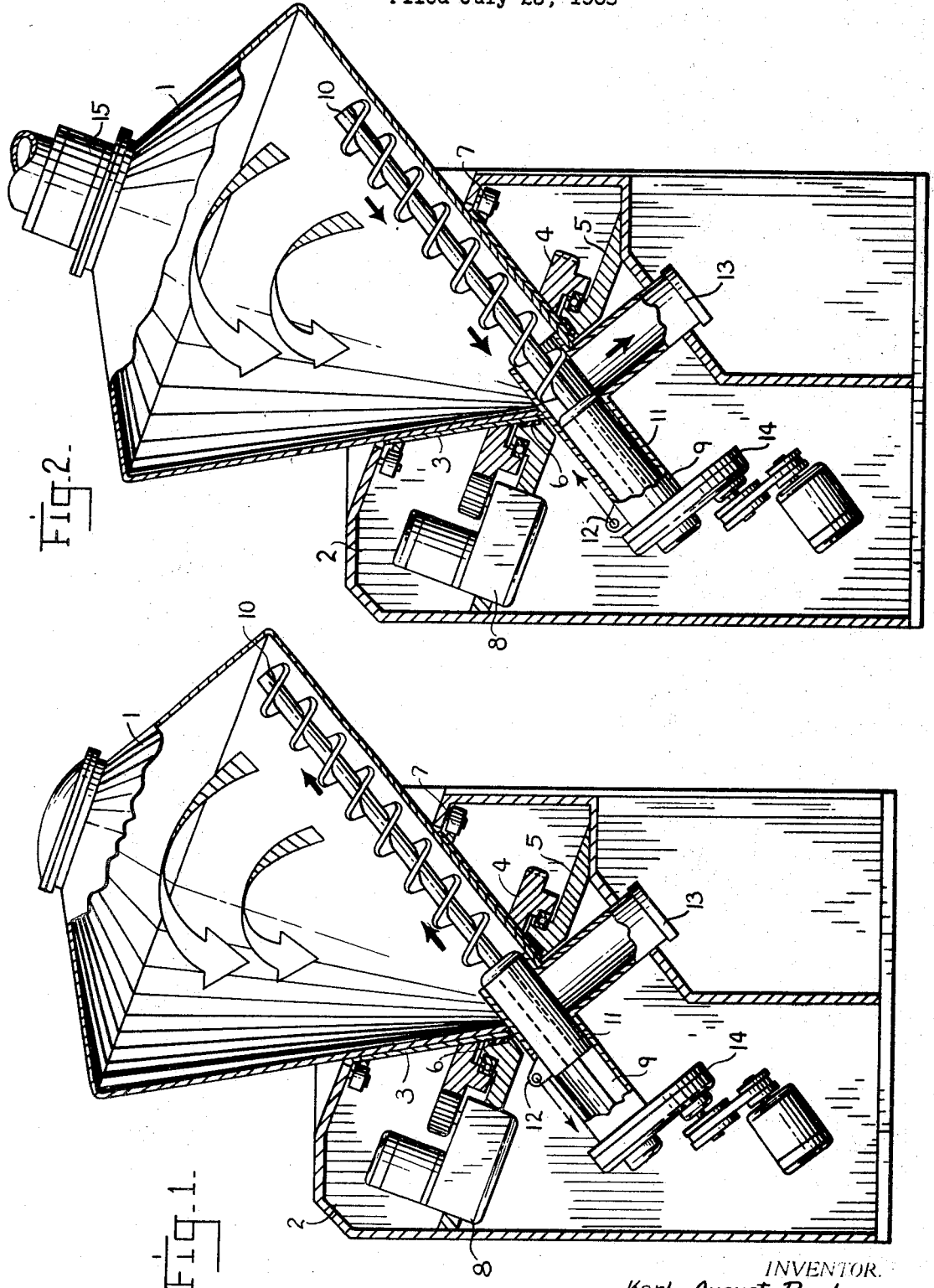

3,536,301
MIXING DEVICE COMPRISING A CIRCULATING MIXTURE CONTAINER HAVING A SLOPING AXIS OF ROTATION
Karl August Berker, Heidenoldendorf, Kreis Detmold, Germany, assignor to Gunther Papenmeier, Pivitsheide, Germany
Filed July 23, 1968, Ser. No. 746,959
Claims priority, application Germany, July 26, 1968, 1,607,780
Int. Cl. B01f 9/08
U.S. Cl. 259—85     5 Claims

ABSTRACT OF THE DISCLOSURE

An upwardly extending circulating, preferably conical mixture container having a sloping axis of rotation. A mixing worm is adapted to rotate about a stationary axis and is disposed approximately parallel to the inner wall of the container.

---

This invention relates to mixers, and more particularly to a circulating, conical mixing container.

Conical mixture containers in which mixing worms are adapted to circulate centrally are known in many variants. With mixing devices of this kind having a centrally arranged mixing tool shaft it is a disadvantage that the material to be mixed is insufficiently agitated and may stick to the wall of the container.

It has been proposed to cause one or more mixing and conveying worms to perform in addition to a rotation about their own axes, a rotation parallel to the wall of the container in order to loosen the material to be mixed from the wall of the container.

In the known mixing machines of this kind pockets are, however, formed very often at the center of the container and in given zones, where the material to be mixed is not agitated.

It is furthermore known to cause a mixture container to rotate about a vertical axis, in which container one or more mixing worms are arranged near and approximately parallel to the wall of the container.

In these known mixing devices comprising conical mixture containers the disadvantages are due to the fact that (a) the material to be mixed, particularly with small charges, is inadequately agitated; (b) the containers can be emptied and cleaned only with difficulty; (c) the technical means required are considerable and a uniform, rapid agitation of the material to be mixed is not always possible when the quantities of the charges are highly different.

There are furthermore known mixing devices comprising a conical container and a delivery worm on the tapering part in line with the axis of the container. This known arrangement of a delivery worm in line with the container axis beneath the mixture container does not have any mixing effect, since this worm does not extend inside the container and cannot pass along the wall of the container.

The invention has for its object to provide an improved agitation of the material to be mixed, in which (a) dead zones in the material to be mixed are avoided; (b) a thorough mixing and agitation can be obtained in a comparatively large container even with minimum charges; (c) this high mixing effect is achieved by only one worm and a stationary shaft; (d) by axial displacement of the worm and reversing the direction of rotation the container can be rapidly emptied and cleaned; (e) the mixture container can be emptied and cleaned without tilting.

For this purpose according to the invention the axis of rotation in a conical, rotatably arranged container is deviated from the vertical whilst in the direction of inclination of the axis of rotation at the lowermost place in the container a mixing worm is arranged, which is adapted to rotate about a stationary axis and to be displaced axially.

By the arrangement according to the invention the mixture located at the container wall or sticking thereto, as the case may be, is constantly fed to the mixing worm so that adhesion of the material to be mixed to the container wall is avoided. The material to be mixed is constantly conveyed by the worm conveyor from the lower position in the container in an upward direction, whilst the worm is always located completely in the material to be mixed, even with a minimum filling of the container.

Particularly the inclined axis of rotation results in a more rapid passage of the material, since the material to be mixed located in the upper part of the container drops from the culmination point directly on the mixing worm, when the mixture container rotates slowly.

By this effective arrangement of the known mixture container a more intensive agitation of the material to be mixed is obtained, even when only small portions of the mixture adhere to the container wall, which portions are loosened from the container wall and are compelled to drop back on the mixing worm. The mixing movement according to the invention results in that the substances to be mixed are not left in a rest position at any place in the container, but are constantly fed to the moving parts of the worm conveyor and to the container wall without being allowed to settle anywhere. As soon as the substances are sufficiently mixed homogeneously, they can be conducted away during the operation of the mixing device. For this purpose it is efficient to reverse the direction of rotation of the mixing worm so that the mixture is no longer conveyed upwards along the container wall but is conveyed in the opposite direction towards the tapering part of the container.

A closing piston arranged in the lower part of the container and supporting the worm is displaced for emptying in an axial direction to an extent such that the mixing worm is completely located in front of the outlet. Without the mixing device according to the invention being switched off, the material mixed can be conducted out of the rotating container. The worm brushes the complete container wall so that any sticking substances are definitely removed from the container.

For strongly adhering raw material the mixing worm itself may be made of an elastic, resistant material, whilst the worm rubs along the container wall and is therefore in direct contact with the surface of the container wall. By this construction and disposition of the mixing worm according to the invention the container can be cleaned from even the smallest residues.

When the container is emptied, the closing piston can again be moved upwards in the container and the mixing device can be filled again.

The axial movability of the closing piston with the worm conveyor permits a continuous mixing operation, the closing piston being shifted periodically to open the outlet and allow the mixing worm to deliver a given quantity of mixed material from the container.

The axis of rotation of the mixture container may deviate from the vertical over any angle of inclination.

The inclination of the axis of rotation may depend upon the material to be mixed; for example, dry and lumpy mixtures may be treated with a smaller angle of inclination of the container, whereas substances of uniform flowability may require a larger angle of inclination of the axis.

According to the invention the circulating container is left open on the outlet side and is provided at this end with a driving ring or reinforced rim, preferably with a toothed rim to permit the rotation of the container. Approximately at one-third of the height of the container a running ring surrounds the reinforced sheath and is adapted to rotate on suitably supporting rollers. The open end of the container is closed by stationary stuffing elements arranged in the bearing plate. The container is rotatably arranged by the toothed rim in the bearing plate. At the center of the bearing plate the housing for the axial displacement of the worm conveyor with the closing piston is arranged in accordance with the angle corresponding with the angle of inclination of the lower container side.

In this stationary housing, arranged in the bearing plate, the worm conveyor is driven through the closing piston.

The worm conveyor may be driven via a change-speed gear both for rotation in the left-hand and in the right-hand directions.

The invention will now be described more fully with reference to the accompanying drawing.

In the drawing:

FIG. 1 is a cross-sectional view of the device according to the invention with an indication of the mixing movement; and FIG. 2 is a cross-sectional view of the same device, the outlet being opened in the emptying position.

As is shown in FIG. 1 the conical container 1 is arranged rotatably in a mixing housing 2, the angle of inclination of the axis of rotation being, for example, about 20°. The lower, here tapering part of the mixture container 1 is surrounded by a reinforced sheath 3 for accommodating a toothed rim 4 or a different machine element for driving the rotatable container 1 about the axis of rotation.

The mixture container 1 with the toothed rim 4 secured thereto is rotatably arranged in the stationary bearing plate 5. The bearing plate 5 comprises the stuffing elements 6, which seal the lower open part of the container 1 with respect to the bearing plate.

A tyre or a reinforced rim surrounds the mixture container 1 for example over the first one-third of the height of the container. The tyre runs on stationary rollers 7, which support the container during the rotation. The drive for the container rotation may be performed via a driving gear 8, in which the speed of rotation is preferably adjustable continuously.

The center of the bearing plate 5 accommodates the housing 9 for the mixing worm 10 and the closing piston 11, which extend partly into the lower opening of the container 1. The mixing worm 10 is located near and approximately parallel to the container wall at a short distance in front thereof and is axially displaceable with the closing piston 11. The axial displacement of the closing piston 11 is performed via a mechanism 12 preferably pneumatically for opening or closing the outlet 13.

A driving motor provided, for example, with a continuously variable change-speed gear drives the mixing worm 10 via a transmission gear 14 to the left or to the right at will. The effective mixing operation, even with the smallest charges, is obtained by the mixing worm 10, conveying obliquely to the vertical direction, whilst the container 1 is rotating.

The driving shaft of the mixing worm 10 is rotatably journalled in the axially displaceable closing piston.

FIG. 2 shows the mixing device according to the invention when the container is being emptied. The closing piston 11 is withdrawn by the mechanism 12 into the housing 9 so that the outlet 13 is opened. The mixing worm 10 rotates during the emptying operation preferably in the reverse direction and conveys the mixed material through the opened outlet 13. The container 1 continues rotating during emptying and any residues of the mixture sticking to the container wall are fed to the mixing worm 10 and conveyed towards the outlet. Thus complete emptying of the container is ensured. In particular cases the mixing worm 10 may be replaced by a double worm in a suitably constructed housing in the container.

To permit constant feeding of unmixed material to the container 1, the latter may be provided with a rotary coupling 15 (FIG. 2) which defines the filling opening of the container 1 and is aligned with its axis of rotation.

Having thus described the invention, what is claimed as new and desired to be secured by Letters Patent is:

1. A mixing device comprising:
an axially rotatable mixture container of inverted, generally conical configuration having a lowermost end and a downwardly converging sidewall terminating at said end;
means mounting said container with its axis disposed in oblique relationship to the vertical and with said sidewall presenting upper and lower sides of the container,
said lower side being inclined downwardly toward said end but forming a maximum angle with the vertical greater than said upper side;
an elongated worm conveyor in said container proximal to said lower side and disposed with its longitudinal axis forming substantially said maximum angle with the vertical,
said conveyor extending from adjacent said lowermost end upwardly along said lower side and being rotatable about the longitudinal axis thereof in a direction to feed material in the container upwardly along said lower side; and
drive means for rotating said conveyor in said direction and simultaneously rotating said container.

2. The mixing device as claimed in claim 1,
said lowermost end of the container being provided with an outlet,
said conveyor being longitudinally shiftable into register with said outlet,
said drive means being operable to rotate the conveyor in the opposite direction to discharge the mixed material through said outlet when the conveyor is shifted into register therewith.

3. The mixing device as claimed in claim 2,
there being a closure member in said container normally closing said outlet and being shiftable to a position opening the outlet,
said conveyor being coupled with said member and shifting therewith into register with said outlet as the member is shifted to said position thereof.

4. The mixing device as claimed in claim 3,
said member comprising a reciprocable piston aligned with said longitudinal axis of the conveyor,
said conveyor having a rotatable shaft provided with a helix rotatable therewith,
said shaft defining said longitudinal axis and being journalled in said piston.

5. The mixing device as claimed in claim 1,
said conveyor having an elastic helix engaging said lower side as the conveyor rotates.

References Cited

UNITED STATES PATENTS

| 934,834 | 9/1909 | Pointon | 259—31 |
| 1,014,909 | 1/1912 | Schenk | 259—85 |
| 1,336,878 | 4/1920 | Aeschbach | 259—85 |
| 3,434,697 | 3/1969 | Carlson | 259—33 X |

FOREIGN PATENTS

| 1,233,154 | 5/1960 | France. |

ROBERT W. JENKINS, Primary Examiner

UNITED STATES PATENT OFFICE
CERTIFICATE OF CORRECTION

Patent No. 3,536,301  Dated October 27, 1970

Inventor(s) Karl August Berker

It is certified that error appears in the above-identified patent and that said Letters Patent are hereby corrected as shown below:

Column 1, line 8, "1968" should read -- 1967 -- .

Signed and sealed this 27th day of March 1973.

(SEAL)
Attest:

EDWARD M. FLETCHER, JR.
Attesting Officer

ROBERT GOTTSCHALK
Commissioner of Patents